United States Patent [19]

Agarwal

[11] Patent Number: 5,541,285
[45] Date of Patent: Jul. 30, 1996

[54] METHOD TO PROCESS NARROW MOLECULAR WEIGHT DISTRIBUTION POLYOLEFINS

[75] Inventor: Pawan K. Agarwal, Houston, Tex.

[73] Assignee: Exxon Chemical Patents Inc., Wilmington, Del.

[21] Appl. No.: 372,475

[22] Filed: Jan. 13, 1995

[51] Int. Cl.⁶ .................................................... C08F 8/00
[52] U.S. Cl. ................................ 528/481; 528/502 F
[58] Field of Search ................................ 528/481, 502 F

[56] References Cited

U.S. PATENT DOCUMENTS 4,452,977   6/1984   Brasz et al. ............................ 528/481

*Primary Examiner*—Thomas R. Weber
*Attorney, Agent, or Firm*—Catherine L. Bell; Frank E. Reid

[57] ABSTRACT

This invention relates to a method to process narrow molecular weight distribution polyolefins, particularly thermoplastics, polyethylenes, polypropylenes, and polyacrylates, whether they are homopolymers or copolymers. The process may be used in any extruder and is typically implemented along the extruder screw and/or barrel by heating the first zone the screw/barrel to place the polyolefin into a molten, flowable state. Thereafter, the polymer is cooled in the second heating zone to a point 50° C. above or 10° C. below the crystalline melting temperature of the polymer and thereafter is reheated in the final heating zone to a molten, flowable state and finally extruding it within 5 seconds or less through the die.

3 Claims, 4 Drawing Sheets

5,541,285

METHOD TO PROCESS NARROW MOLECULAR WEIGHT DISTRIBUTION POLYOLEFINS

FIELD OF THE INVENTION

This invention relates to the processing of polyolefin polymers and improvement of their processing capabilities by varying temperature profile along the barrel and die exit of an extruder.

BACKGROUND OF THE INVENTION

In the recent past there has been a new class of catalyst disclosed that produces new olefinic polymers and copolymers having many new and unique properties. In particular, these polymers offer strength properties based on their narrow molecular weight distribution. These polymers, however, are more difficult to process than their predecessors and thus methods of improving their processability are being sought. This invention relates to an improvement in the processing abilities of these and other narrow molecular weight distribution polymers.

Semi-crystalline polyolefins, such as polyethylene and polypropylene, are processed well above their melting temperatures. In the case of polyethylene, the processing temperature is usually in the range of 190° to 260° C. for extrusion and blow molding operations. For polypropylene in most of the cases, this temperature range is also suitable, although in case of specialty polypropylene it could be higher. The processing temperature and other parameters are obviously functions of the polymer grade and operation being sought. However, one thing is clearly emerging due to rapid advances in the processing and converting technology. It is desired that such materials be processed at the highest throughput rates possible with minimum energy consumption, that is, with the least possible head pressures during processing.

In order to accomplish this in the industry today, processing operations and screw designs are altered routinely for processing both conventional and specialty polyethylenes. The successful processing of non-conventional polymers such as narrow molecular weight distribution polyethylenes remains a challenge to the industry. In fact, even conventional so called linear polyethylenes (LLDPE) having a weight average molecular weight in the range of 35,000 to 200,000 and a molecular weight distribution of Mw over Mn less than equal to 5 cannot be processed at very high speeds using conventional polyethylene extruders. The latter is often desired and demanded due to obvious economic reasons. At high speeds in polyethylenes, as well as other conventional polymers such as polypropylene and polystyrene, flow instabilities occur during all sorts of processing operations including fiber spinning, extrusion, coating, film blowing and molding. Above a critical speed or, in other words, above critical stress and strain rates, the melt flow instabilities yield the extruded product which is highly distorted. In the extreme case, it can be chaotic. At times, even at relatively low speeds, the distortions of the extrudate of some grades of polyethylene can be bad enough to be readily detectable with the naked eye. Distortions, if limited to the surface, are called sharkskin. As the name implies, sharkskin consists of regular grooves and cracks perpendicular to the flow direction of the extrudate. Increase in the speed results in the increase of the severity of distortion, first appearing as a more wavy fracture then grossly helical distortions followed by at extremely high speeds, gross melt fracture and destruction of the extrudate. Such behavior obviously limits the throughput rates of polymers. This subject has been under study for nearly 30 years and continues to be investigated by industry and academia. The subject, for example, has been discussed in various polymer rheology books and chapters authored or edited by Eirich, Walters, Han, Keller (independent authors) and chapters in Encyclopedia of Polymer Science and Technology.

The phenomena of flow instability of high polymer melts at high shear rates is due to their inherent viscoelastic nature. The viscoelasticity of particular polymers is dictated by its molecular architecture and is the controlling factor in processing. Generally it is observed that polymers having broader molecular weight distributions, i.e., an Mw over Mn of greater than five can be processed at relatively high shear rates as compared to those having narrow molecular weight distributions. At any given shear rate and temperature, especially those employed in commercial processing operations, for high molecular weight polymers, the broad molecular weight distribution polymers have lower viscosities than corresponding narrow molecular weight distribution polymers.

Further, it is also an experimental fact that the drop to lower viscosity from the initial equilibrium viscosity, the so-called zero shear viscosity, $\eta_0$, occurs at lower shear rates for broad molecular weight distribution than at narrow molecular weight distribution. Due to these two factors, at a given processing temperature and pressure, broad molecular weight polymers can be processed at corresponding higher rates than the narrow molecular weight counterparts. Conventional wisdom suggests that the lower molecular weight chains and broad molecular weight distribution polymers help in reducing not only the number of entanglements per unit volume, but also lower their rate of formation as well. Intuitively, thus, longer chains will have a higher probability of entangling than compositions with shorter chains. It is conjuncture that for this reason narrow high molecular distributed polymers have problems in processing at conventional and higher processing speeds.

SUMMARY OF THE INVENTION

This invention relates to a process to improve the processability of olefin polymer comprising cooling and heating selected section of the extruder barrel just prior to the final extrusion of the polymer. This process also relates to polymers having increased melt strength and final strength properties.

DETAILED DESCRIPTION OF PREFERRED EMBODIMENTS

Figure 1:
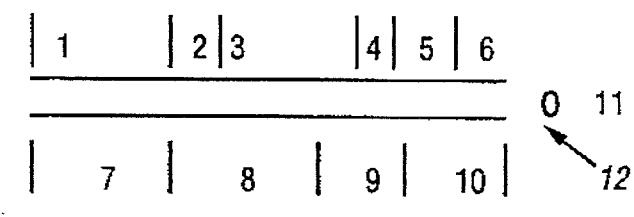
FIG. 1 is a schematic drawing of the heating zones of an extrusion process.
Figure 2:
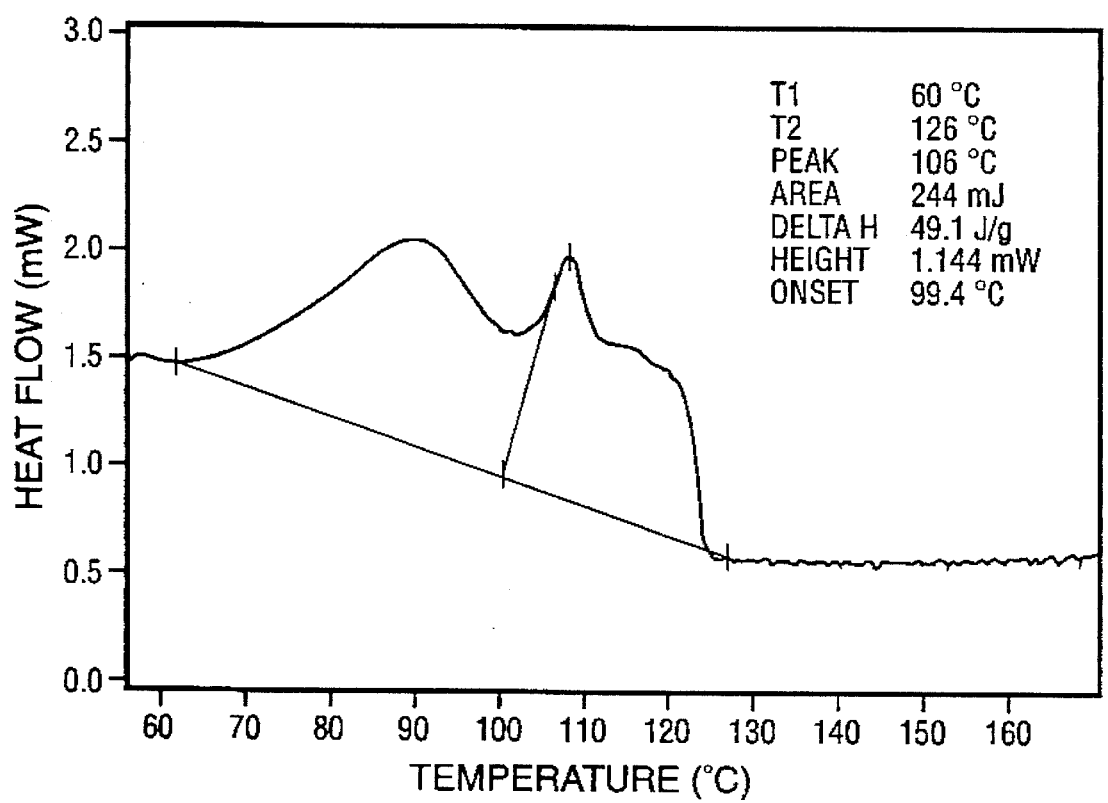
FIG. 2 is a DSC trace of the polymer treated in Example 1.
Figure 3:
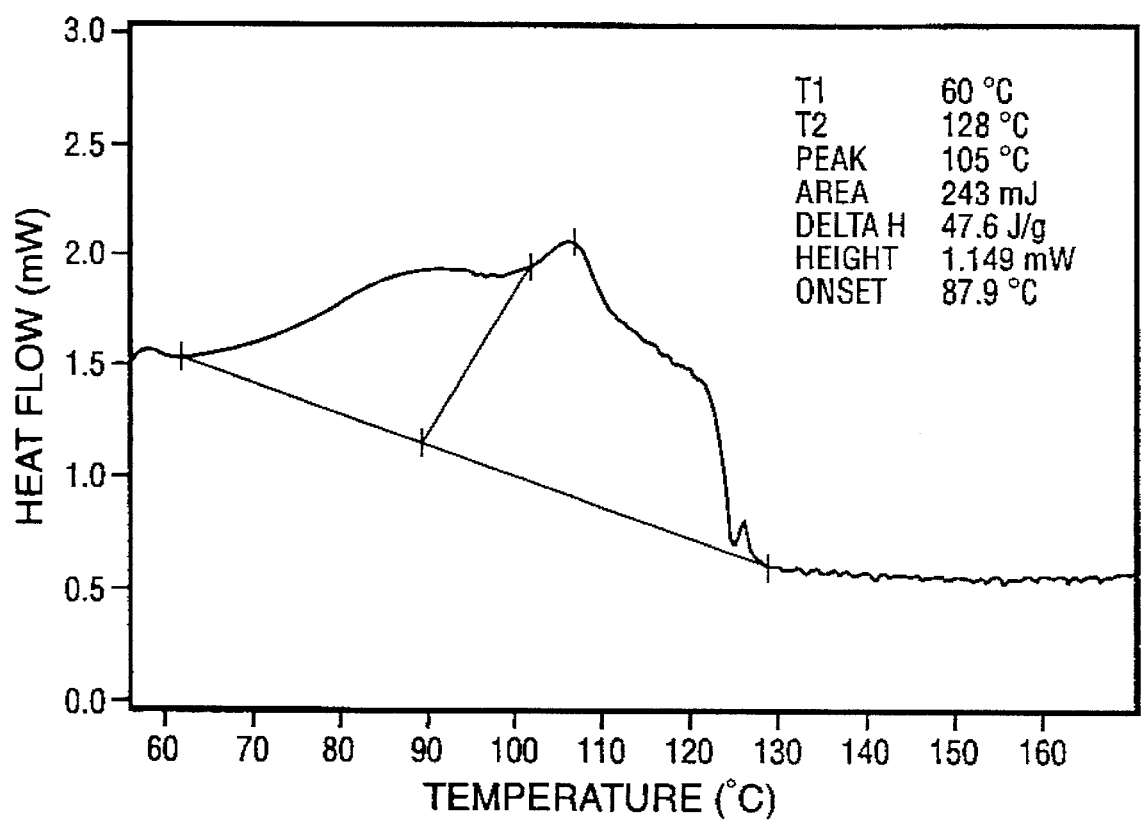
FIG. 3 is a DSC trace of the polymer treated in Example 6.
Figure 4:
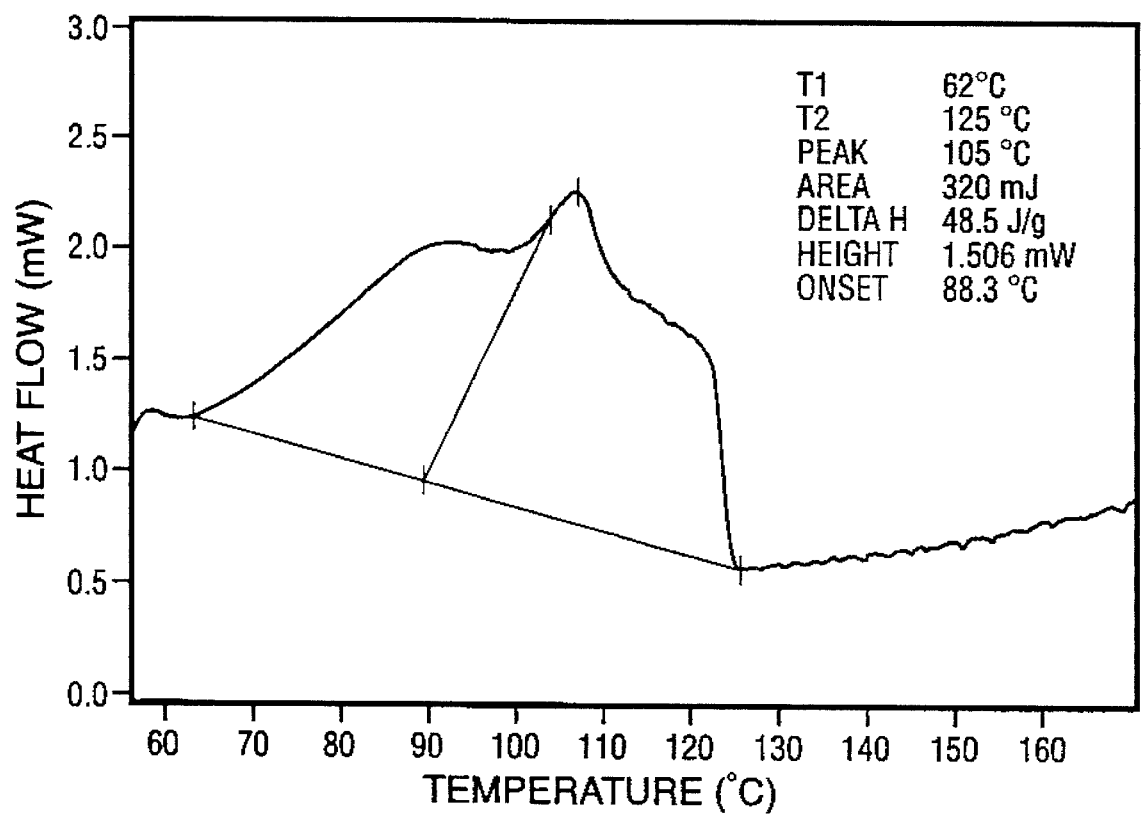
FIG. 4 is a DSC trace of the polymer treated in Example 10.
Figure 5:
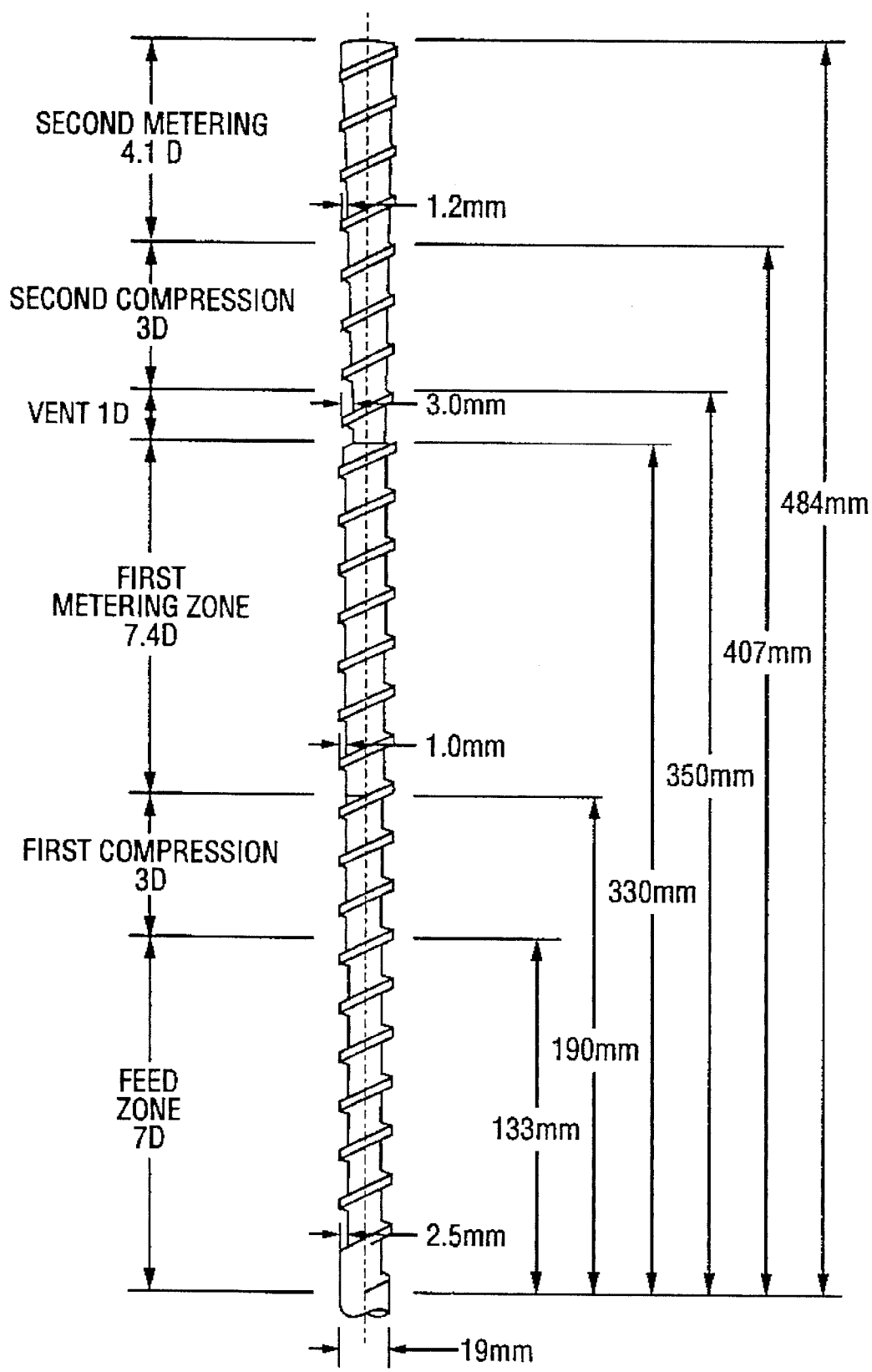
FIG. 5 is a schematic drawing of the extruder screw used in the examples (in millimeters).

In a preferred embodiment this invention relates to methods for processing narrow molecular weight distribution polymers, preferably having a molecular weight distribution ("Mw/Mn") less than or equal to five, preferably less than or equal to four, even more preferably less than or equal to three. In particularly preferred embodiments, the Mw/Mn is between 1.5 and 5, preferably between 2 and 4, even more preferably between 2.5 and 3.5. It has been observed that the more narrow the molecular weight distribution the more effective this method is on processability. This method may be applied to essentially any polyolefin; however, homopolymers and copolymers of ethylene and/or propylene and acrylates are preferred polymers. Indeed, any thermoplastic polyolefin or thermoplastic elastomers can be modified by this method.

In a preferred embodiment, this invention relates to a method for processing narrow molecular weight distribution polymer at high speeds comprising heating the polymer to a flowable, molten state, typically about 50° to 130° C. above the crystalline melting point as determined by DSC, first peak, then quickly reducing the temperature of the molten polymer to the temperature that is within 50° C. above and 10° C. below the crystalline melting point of the subject polymer, preferably within 30° C. above to 10° C. below, even more preferably within 10° above or below the crystalline melting point and thereafter heating the polymer back up to a flowable, molten state and extruding the polymer through a die. The polymer is preferably extruded quickly after being cooled. Typically the polymer is extruded within 5 seconds of entering the cooling zone, even more preferably within 3 seconds of entering the cooling zone, even more preferably within 2 seconds of entering the cooling zone, even more preferably within 1 second of entering the cooling zone. (The cooling zone is that section of the extrusion zone, typically along the extruder barrel, where the polymer temperature is reduced. In a preferred embodiment, the heating and cooling processes may take place along the various screw extrusion zones or barrels. The cooling of the barrels is typically accomplished by wrapping cooling coils along the barrel. This method is effective in any commercial extruder and may be practiced on any variety of polyolefins, particularly, thermoplastic polyolefins, even more particularly, ethylene homopolymer and copolymers, propylene homopolymer and copolymers, and acrylate homopolymers and copolymers. By molten, flowable state it is meant a state where the viscosity of the polymer is reduced such that the polymer will move through the processing equipment at useful speeds. The useful speeds in a extruder generally correspond to shear rates in the range of 10 to $10^4$ sec$^{-1}$.

It has been noted that the particular point within the range of 10° below the crystalline melting point to 50° above the crystalline melting point (Tm) to which a certain polymer is taken to obtain improved processing properties may be dependent on the shear rate. It has also been noted that a more aggressive or faster shear rate enables one to reduce the temperature to below the crystalline melting temperature without causing the polymer to become substantially solid.

In a preferred embodiment, the cooled polymer is reheated to a molten state, preferably to a point 50° C.–80° C. above the Tm. Higher temperatures are within the scope of this invention. In preferred embodiments, the polyolefin temperature is not raised more than 70° to 80° above the crystalline melting temperature before it exits the die. In a preferred embodiment, polyethylene is extruded along the length of a screw extruder at a temperature of about 200° C. or slightly above it to about 230° C. especially in the feed, first compression and first metering zones. At a point before the exit of the extrudate through the die, the polymer extrudate temperature is reduced to within about 50° C. of the crystalline melting point and then reheated to a molten, flowable state, typically about 70°–80° above the crystalline melting temperature just before it exits the die. If desired, depending upon the grade of polymer, the temperature of the die could be kept higher, up to about 200° C. in order to facilitate the processing.

While not wishing to be bound by any theory, the inventor believes that the reduction in temperature minimizes entanglements and in effect "stretches" the polymer chains and contributes to the increased processability of the polymer and simultaneously contributes to the increased clarity, the increased strength, and the increased melt properties. In a typical embodiment, the cooling is practically done by lowering the temperature of an extruder zone intermediate between the final, usually the second metering section, and the first melting or compression zone.

FIG. 1 is an illustration of a typical screw extruder. "1" describes the typical feed zone which is typically 7D, where D is the diameter of the screw, "2" describes the first compression zone which is typically 3D, "3" is the first metering zone which is typically 7.4D; "4" is the vent zone which is typically 1D, "5" is the second compression zone which is typically 3D, and "6" is the second metering zone which is 4.1D usually. "7" is zone one which has the first temperature (T1), "8" is the second zone which contains the second temperature (T2), "9" is the third zone which comprises the third temperature (T3) and "10" is the fourth zone which comprises the fourth temperature (T4), "11" is the die exit, and "12" is the die pressure. In these zones, temperature is typically controlled via appropriate electric heaters placed along the barrel of the extruder. For sake of clarity, the diagram shows four temperature zones only, although more or less heaters, heating elements or cooling coils could be installed and employed along the length of the screw in order to properly heat and control the temperature of an extruder and the extrudate. Likewise, cooling elements such as water jackets may be installed along the barrel to provide the cooling to a point within 50° of the Tm. In a preferred embodiment, the polymers are extruded within less than one second after the cooling procedure, even more preferably 0.75 seconds, even more preferably less than 0.5 seconds, even more preferably within 0.25 seconds after the cooling procedure. In conventional polyethylene processes, the various temperature zones identified as "7", "8", "9" and "10" in FIG. 1 are kept at identical temperatures typically at about 210°±30° C. In the instant invention, however, zone three which is "9" in FIG. 1 is the zone at which the temperature of the polymer composition is reduced to 50° C. of the crystalline melting temperature.

Simultaneously, in order to read pressure generated along various zones, pressure transducers are installed. In the present case the head pressure was measured at position 12.

In a preferred embodiment, this invention relates to a method to process narrow molecular weight distribution polyolefins, particularly thermoplastics, polyethylenes, polypropylenes, and polyacrylates, whether they are homopolymers or copolymers. The process may be used in any extruder and is typically implemented along the extruder screw barrel by heating the first zones of a barrel to place the polyolefin into a molten, flowable state. Thereafter, the polymer is cooled to a point within 50° C. above or 10° C. below the crystalline melting temperature of the polymer and thereafter is reheated to a molten, flowable state and extruded within one second or less after being cooled.

The polymers that are produced after the instant cooling treatment have undergone changes which may be observed by standard DSC techniques. Changes in the crystalline melting temperature and the enthalpy of fusion are noted and, in particular, these changes lead to polymer products with unexpected properties.

All references including testing procedures described above are incorporated by reference herein in their entirety. All molecular weights are weight average unless otherwise stated. All temperatures are in degrees Celsius unless otherwise stated.

EXAMPLES

Table I shows the processing conditions of a commercially-made narrow molecular weight distribution polyethylene produced by Exxon Chemical Company having about 10 weight % butene, a molecular weight distribution (Mw/Mn) of 2.4, a density of 0.904 g/cc, a crystalline melting point of 103.5 (by DSC, 10° C. per minute) and a melt index value of 4.4 at 190° C./2.13 kg Density is measured by ASTM D-792. Melt Index is measured by ASTM 1238 condition e. Example 1 is a polyethylene control example having a broad molecular weight distribution of greater than 2.5.

TABLE 1

| Example | Screw/barrel Zone Temp.'s (°C.) | | | | Die Pressure bar/MPa | Surface Roughness (μm) | Surface Comments |
|---|---|---|---|---|---|---|---|
| | T1 | T2 | T3 | T4 | | | |
| 1 (cont) | 220 | 220 | 212 | 215 | 182/18.2 | 0.7 | excellent |
| 2 (comp) | 220 | 190 | 173 | 158 | 225/22.5 | 47.8 | very bad |
| 3 (comp) | 190 | 190 | 186 | 159 | 241/24.1 | 35.4 | bad |
| 4 (comp) | 190 | 170 | 156 | 153 | 240/24.0 | 34.4 | poor |
| 5 (comp) | 220 | 170 | 159 | 148 | 240/24.0 | 18.0 | poor |
| 6 | 220 | 160 | 154 | 219 | 195/19.5 | 4.4 | very good |
| 7 | 220 | 160 | 152 | 179 | 225/22.5 | 22.8 | good |
| 8 (comp) | 220 | 160 | 160 | 140 | 240/24.0 | 21.8 | very good |
| 9 (comp) | 220 | 160 | 160 | 145 | — | 13.0 | — |
| 10 (comp | 180 | 220 | 152 | 141 | 248/24.8 | 14.2 | good |

(cont) = control;
(comp) = comparison

The polymers was passed through four zones along the extruder barrel. Temperatures T1 and T2 are the set temperatures. The actual temperatures are typically within ±5° C. Temperatures T3 and T4 are actual temperature readings. The surface roughness is a measure of the average groove depth and was determined using a needle Profilometer following DIN-4768 ; and DIN-4769. The instrument used was a surface texture measuring instrument. It employs a stylus diamond 5 micron tip and is manufactured by Advanced Metrology Systems, LTD., Leicester, England. Lower numbers indicate smoother extrudates. The data in table 1 were gathered in a Brabender Plasti-corder PL-2000 with a 90° round die L/D=15, D=1 mm. All Examples were extruded at nearly the same rate of throughput. The throughput range for the examples was 5–10 gm/min. Further, from the data appearing in Table 1, it can be readily noted that if the extrusion operation is carried out according to the instant invention, the materials that are extruded are not only of good quality but the processing is achieved at milder conditions. Particularly, it is observed that the head pressures are low. For example, the head pressure in Example 6 (195 bar/19.5 MPa) is similar to the head pressure in control Example 1 (182 bar/18.2 MPa), processed under conventional processing conditions. Head pressure of the extruder indicates the energy required for processing. Lower pressures mean lower energy consumption which translates to faster production and lower costs. It also enables one to operate the machine at faster speeds.

As is apparent from the foregoing description, the materials prepared and the procedures followed related to specific embodiments of the broad invention. It is apparent from the foregoing general description and the specific embodiments that, while forms of the invention have been illustrated and described, various modifications can be made without departing from the spirit and scope of this invention. Accordingly, it is not intended that the invention be limited thereby.

I claim:

1. A method to process a polyolefin polymer having a molecular weight distribution of less than or equal to 5, said process comprising heating the polymer to a molten, flowable state of about 50° C. to 130° C. above the polymer's crystalline melting temperature as determined by DSC, first peak,(Tm), reducing the temperature of that polymer to a temperature that is within the range of from 50° C. above the polymer's Tm to 10° C. below the polymer's Tm, and then increasing the temperature of that polymer to a molten, flowable state of about 50° C. to 130° C. above the polymer's Tm immediately thereafter and extruding the polymer through a die within 2 seconds of reducing the temperature of the polymer.

2. The process of claim 1 wherein the heated molten polymer is reduced in temperature to a temperature within the range of from (Tm−10° C.) to (Tm+30° C.).

3. The process of claim 1 wherein the polymer is extruded through the die within one second of exiting cooling step.

* * * * *